United States Patent [19]

Ohmura

[11] 4,196,537
[45] Apr. 8, 1980

[54] LINE GUIDING RING FOR FISHING RODS
[75] Inventor: Ryuichi Ohmura, Shizuoka, Japan
[73] Assignee: Fuji Kogyo Co., Ltd., Shizuoka, Japan
[21] Appl. No.: 909,680
[22] Filed: May 25, 1978
[51] Int. Cl.² ............................................. A01K 87/04
[52] U.S. Cl. ...................................................... 43/24
[58] Field of Search ....................... 43/24; 254/190 D; 242/157 R

[56] References Cited
U.S. PATENT DOCUMENTS

| | | | |
|---|---|---|---|
| 1,861,819 | 6/1932 | Russell | 242/157 R |
| 1,923,263 | 8/1933 | Heddon | 43/24 |
| 2,399,132 | 4/1946 | Maynes | 43/24 |
| 4,011,680 | 3/1977 | Rienzo | 43/24 |
| 4,051,618 | 10/1977 | Ohmura | 43/24 |

Primary Examiner—Nicholas P. Godici
Attorney, Agent, or Firm—Cantor and Singer

[57] ABSTRACT

An advantageous and improved construction is provided for a line guiding ring for fishing rods comprising a guide ring a shock ring and a fixed ring, in which a collar is formed on the outer periphery of the upper edge of the shock ring and a seat is formed on the inner periphery of the lower edge thereof. Such a construction renders it possible to lock the guide ring to the shock ring with the seat and the shock ring to the fixed ring with the collar, thereby locking the guide ring to the fixed ring is greatly improved against a one directional force exerted upon the guide ring.

1 Claim, 6 Drawing Figures

LINE GUIDING RING FOR FISHING RODS

BACKGROUND OF THE INVENTION

Deep sea fishing requires fishline of several hundred meters and often an electromotive reel is used. The electromotive reel of this type retrieves a fishing line at high speed and a swivel often collides with a tip top guide, so strongly that a guide ring gets out of place. Although it is, of course, desired to stop the rotation of the motor when the swivel approaches the tip top guide, it is extremely difficult to observe the swivel coming out from the sea. Since the distance between the tip top guide and the surface of the sea is very short, therefore the swivel coming into collision with the tip top guide is virtually inevitable.

SUMMARY OF THE INVENTION

The present invention relates to a tip top guide for fishing rods and more particularly, to a tip top guide which is fitted to a fishing rod employing an electromotive reel. Taking the aforementioned fact into account, the present invention improves the shape of a shock ring of a tip top guide for the purpose of preventing a guide ring from getting out of place when a swival collides with the tip top guide.

BRIEF DESCRIPTION OF THE DRAWINGS

A preferred embodiment of the invention is described in the following detailed description, which may be best understood when read in connection with the accompanying drawings in which.

DETAILED DESCRIPTION OF THE INVENTION

Figure 1:
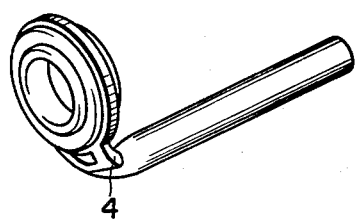
FIG. 1 is a perspective view showing one embodiment of the present invention.

Referring now to the drawings in which like numerals are used to indicate like parts throughout the various views thereof. Numeral 1 represents a guide ring, 2 a shock ring, 3 a fixed ring and 4 a support leg. The functions of the parts are substantially similar to those of conventional guides. Numeral 5 is a collar designed and formed on the outer periphery of the upper edge of the shock ring 2, which is in engagement with upper edge of the fixed ring 3. Numeral 6 is a seat formed on the inner periphery of the lower edge of the shock ring 2, which is in engagement with the lower edge of the guide ring 1. The method for assembling the line guide is substantially similar to that of conventional line guide, namely, press insertion of the shock ring 2 into the fixed ring 3 and pressing insertion of the guide ring 1 into the shock ring 2.

Figure 2A:
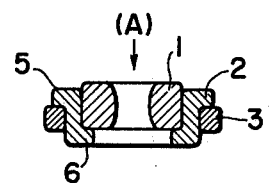
FIG. 2(a) is a sectional view showing the critical parts of the line guide ring according to the present invention.
Figure 3:
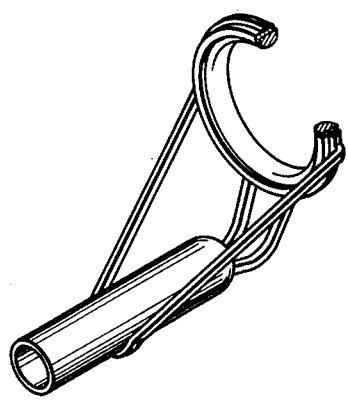
FIG. 3 is a perspective view, partially cut out of a line guide ring with a different support.
Figure 2B:
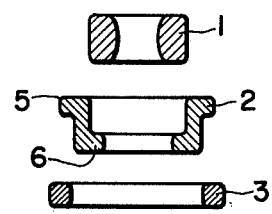
FIG. 2(b) is an exploded view thereof.
Figure 4:
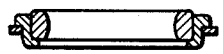
FIG. 4 is a sectional view showing the assembled line guide ring.
Figure 5:
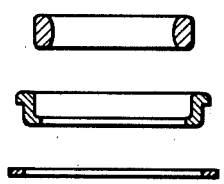
FIG. 5 is an exploded view of FIG. 4.

When a force is applied to the guide ring 1 of the line guiding ring in the direction of arrow A as shown in FIG. 2(a) a movement of the guiding ring is stopped by the seat 6 of the shock ring 2, while a movement of the shock ring 2 is stopped by the collars of the shock ring 2 bearing against fixed ring 3, thus the guide ring 1 is prevented from getting out of the place.

While a preferred embodiment of the present invention has been shown in the foregoing specification, it will, of course, be understood that various modifications and changes may be made therein without departing from the invention, it is, therefore, intended that the following claim covers all such modifications and changes, as it may be full within the spirit and scope of the present invention.

What is claimed is:

1. In a line guide ring for a fishing rod comprising a fixed ring, a shock ring press fit into said fixed ring, a guide ring press fit into said shock ring, and means affixed to said fixed ring to support and mount the same to a fishing rod, the improvement comprising a flange on the outer periphery of the upper edge of the shock ring forming a collar bearing against said fixed ring, and a flange on the inner periphery of the lower edge thereof forming a seat against which said guide ring bears, said shock ring thereby being S-shaped in cross-section.

* * * * *